(12) United States Patent
Wan et al.

(10) Patent No.: US 10,311,031 B2
(45) Date of Patent: Jun. 4, 2019

(54) METHOD, APPARATUS, AND STORAGE MEDIUM FOR REMOVING REDUNDANT INFORMATION FROM TERMINAL

(71) Applicant: TENCENT TECHNOLOGY (SHENZHEN) COMPANY LIMITED, Shenzhen (CN)

(72) Inventors: Xucheng Wan, Shenzhen (CN); Yanhui Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 729 days.

(21) Appl. No.: 14/749,753

(22) Filed: Jun. 25, 2015

(65) Prior Publication Data

US 2015/0293950 A1 Oct. 15, 2015

Related U.S. Application Data

(63) Continuation of application No. PCT/CN2013/084000, filed on Sep. 23, 2013.

(30) Foreign Application Priority Data

Dec. 26, 2012 (CN) .......................... 2012 1 0575993

(51) Int. Cl.
*G06F 16/215* (2019.01)
*G06F 16/174* (2019.01)
(Continued)

(52) U.S. Cl.
CPC ............ *G06F 16/215* (2019.01); *G06F 16/11* (2019.01); *G06F 16/16* (2019.01); *G06F 16/1748* (2019.01)

(58) Field of Classification Search
CPC ........... G06F 17/30303; G06F 17/3007; G06F 17/30115; G06F 17/30117;
(Continued)

(56) References Cited

U.S. PATENT DOCUMENTS

2007/0136402 A1 6/2007 Grose et al.
2010/0153675 A1 6/2010 Kumar
(Continued)

FOREIGN PATENT DOCUMENTS

CN 1996886 A 7/2007
CN 101833512 A 9/2010
(Continued)

OTHER PUBLICATIONS

The State Intellectual Property Office of the People's Republic of China (SIPO) Office Action 1 for 201210575993.6 dated Aug. 30, 2016 pp. 1-8.
(Continued)

*Primary Examiner* — Amanda L Willis
(74) *Attorney, Agent, or Firm* — Anova Law Group, PLLC

(57) ABSTRACT

This application relates to the technical field of network communications, and discloses a method and an apparatus for removing redundant information of a terminal. The method includes the steps of: calculating an estimated redundancy value of at least one type of redundant information in a terminal; determining that a redundancy value of a type of redundant information reaches a threshold of the type of redundancy value; prompting a user to remove redundant information; and according to confirmation from the user, removing the type of redundant information or all redundant information. The apparatus includes a first calculating unit, a determining unit, a prompting unit and a cleanup unit. According to the method and the apparatus of
(Continued)

this application, an estimated redundancy value of redundant information of a terminal can be calculated actively by analyzing historical redundant data information of a user, and the user is prompted to process redundant information that reaches a threshold without the need for scanning, thereby saving system resources, improving system performance and also saving user time.

13 Claims, 3 Drawing Sheets

(51) Int. Cl.
*G06F 16/16* (2019.01)
*G06F 16/11* (2019.01)

(58) Field of Classification Search
CPC ......... G06F 17/30129; G06F 17/30135; G06F 17/3015; G06F 17/30156; G06F 12/0253; G06F 12/0269; G06F 12/0276; G06F 2212/7205; G06F 2212/702; G06F 2212/1044; G06F 3/0652; G06F 3/0653; G06F 11/1453; G06F 11/2094
See application file for complete search history.

(56) References Cited

U.S. PATENT DOCUMENTS

2012/0210088 A1\* 8/2012 Iizuka ................ G06F 12/0238
711/166
2012/0324199 A1 12/2012 Yamashita et al.

FOREIGN PATENT DOCUMENTS

| CN | 101943995 A | 1/2011 |
| CN | 102279892 A | 12/2011 |
| CN | 102654872 A | 9/2012 |

OTHER PUBLICATIONS

The World Intellectual Property Organization (WIPO) International Search Report for PCT/CN2013/084000 dated Jan. 2, 2014.
Taiwan Intellectual Property Office (TIPO), "Concise Explanation of Relevance for TW OA1"; TIPO; Dec. 26, 2012.

\* cited by examiner

METHOD, APPARATUS, AND STORAGE MEDIUM FOR REMOVING REDUNDANT INFORMATION FROM TERMINAL

CROSS-REFERENCES TO RELATED APPLICATIONS

This application is a continuation of PCT Application No. PCT/CN2013/084000, filed on Sep. 23, 2013, which claims priority to Chinese Patent Application No. CN 2012105759936, filed on Dec. 26, 2012, the entire content of all of which is incorporated herein by reference.

FIELD OF THE TECHNOLOGY

The present disclosure generally relates to the technical field of network communications and, more particularly, relates to a method, an apparatus, and storage medium for removing redundant information of a terminal.

BACKGROUND OF THE DISCLOSURE

Over time, operations in a terminal generate a great amount of redundant information, including redundant file information and the like. When there is a large amount of redundant information, a lot space of a magnetic disk in the terminal is occupied, and available space of the magnetic disk is reduced. As a result, an operational speed of the terminal is slowed down, system performance is further degraded, and sometimes even normal operation of a system or other application programs is affected. Therefore, the redundant information of the terminal needs to be removed.

In the existing technology, users perform scanning on a terminal through an application program so as to acquire an actual redundancy value of redundant information in the terminal, thereby removing the redundant information.

The users often have a weak perception of the redundant information in the terminal, and cannot know the actual redundancy value of the redundant information if active detection is not performed; therefore, the users cannot timely remove the redundant information to improve terminal performance. Additionally, estimation of the amount of the redundant information requires a scanning process, which requires consumption of system resources and user time.

SUMMARY

In order to solve the problem of the existing technology, embodiments of the present invention provide a method and an apparatus for removing redundant information of a terminal and a computer program product. The technical solutions are described as follows:

According to an aspect, an embodiment of the present invention provides a method for removing redundant information of a computing terminal, the method including:

calculating an estimated redundancy value of at least one type of redundant information in the computing terminal;

determining that an estimated redundancy value of a type of redundant information reaches a threshold of the type of redundancy value;

prompting a user to remove redundant information; and removing the type of redundant information or all redundant information according to confirmation from the user.

According to another aspect, an embodiment of the present invention provides an apparatus for removing redundant information of the computing terminal, the apparatus including:

a first calculating unit, configured to calculate an estimated redundancy value of at least one type of redundant information in the computing terminal;

a determining unit, configured to determine that an estimated redundancy value of a type of redundant information reaches a threshold of the type of redundancy value;

a prompting unit, configured to prompt a user to remove redundant information; and a cleanup unit, configured to remove the type of redundant information or all redundant information according to confirmation from the user.

According to still another aspect, an embodiment of the present invention provides a computer program product including a program instruction, when the program instruction runs on a computer, the computer executing all steps of the foregoing method for removing redundant information of the computing terminal.

According to another aspect, an embodiment of the present invention provides a non-transitory computer readable storage medium including a computer readable program stored thereon. When being executed, the computer readable program causes one or more processors to implement a method for removing redundant information in a computing terminal, the method including:

calculating an estimated redundancy value of at least one type of redundant information in the computing terminal;

determining that an estimated redundancy value of a type of redundant information reaches a threshold of the type of redundancy value;

prompting a user to remove redundant information; and removing the type of redundant information or all redundant information according to confirmation from the user.

Beneficial effects of the technical solutions provided by the embodiments of the present invention are as follows:

According to the method and the apparatus of the present disclosure, an estimated redundancy value of redundant information of a terminal can be calculated actively by analyzing historical redundant data information of a user, and the user is prompted to process redundant information that reaches a threshold without the need for scanning, thereby saving system resources, improving system performance and also saving user time.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention. A person of ordinary skill in the art may still derive other drawings from these accompanying drawings without creative efforts.

DESCRIPTION OF EMBODIMENTS

In order to make the objectives, technical solutions and advantages of the present disclosure clearer, the following describes the implementation manners of the present disclosure in further detail with reference to the accompanying drawings.

Embodiment 1

Figure 1:
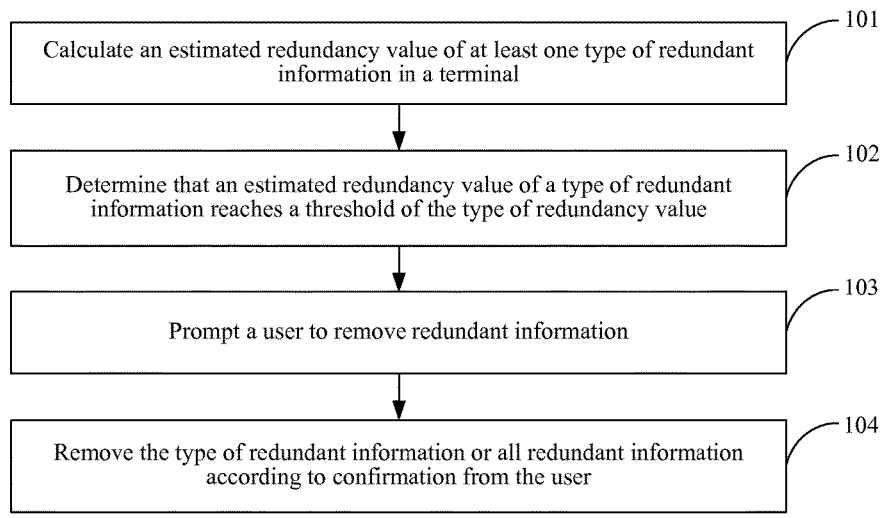
FIG. 1 illustrates a flowchart of a method for removing redundant information of a terminal according to Embodiment 1 of the present invention.

Referring to FIG. 1, this embodiment of the present invention provides a method for removing redundant information of a terminal. Processes of the method include:

Step 101: calculating an estimated redundancy value of at least one type of redundant information in a terminal such as a computing terminal.

Step 102: determining that an estimated redundancy value of a type of redundant information reaches a threshold of the type of redundancy value.

Step 103: prompting a user to remove redundant information.

Step 104: removing the type of redundant information or all redundant information according to confirmation from the user.

Before calculating the estimated redundancy value of at least one type of redundant information in a terminal, the method may further include a step of:

for each type of redundant information in the terminal, calculating redundancy frequency or average redundancy frequency of a specified number of times of the type of redundant information according to a cleanup period and an actual redundancy value detected during a cleanup.

The calculating of an estimated redundancy value of at least one type of redundant information in a terminal may include steps of:

acquiring a time interval between a previous cleanup time of at least one type of redundant information in the terminal and a current time, and for each type of redundant information among the at least one type of redundant information, calculating an estimated redundancy value of the type of redundant information according to redundancy frequency or average redundancy frequency of the type of redundant information and an acquired time interval of the type of redundant information.

The method may further include a step of:

for each type of redundant information in the terminal, calculating a threshold of the type of redundant information according to the actual redundancy value detected during a specified number of times of cleanups.

The method may further include steps of:

for each type of redundant information during a current cleanup, calculating redundancy frequency of the type of redundant information according to a cleanup period and an actual redundancy value detected during the current cleanup, and updating pre-stored average redundancy frequency of the type of redundant information according to the redundancy frequency.

In this embodiment, the terminal may be any computing terminal including, but not limited to, a computer, a mobile phone, a tablet computer, a personal digital assistant (PDA), and the like.

In the foregoing method provided by this embodiment, an estimated redundancy value of at least one type of redundant information in a terminal is calculated; it is determined that an estimated redundancy value of a type of redundant information reaches a threshold of the type of redundancy value; a user is prompted to remove redundant information; and the type of redundant information or all redundant information is removed according to confirmation from the user. In this way, an estimated redundancy value of redundant information of a terminal can be calculated actively by analyzing historical redundant data information of a user, and the user is prompted to process redundant information that reaches a threshold without the need for scanning, thereby saving system resources, improving system performance, and also saving user time.

Additionally, for each type of redundant information in the terminal, a threshold of the type of redundant information is calculated according to an actual redundancy value detected during a specified number of times of cleanups, so that the threshold of the redundant information is more consistent with a cleanup habit of the user, thereby improving user experience.

Embodiment 2

Figure 2:
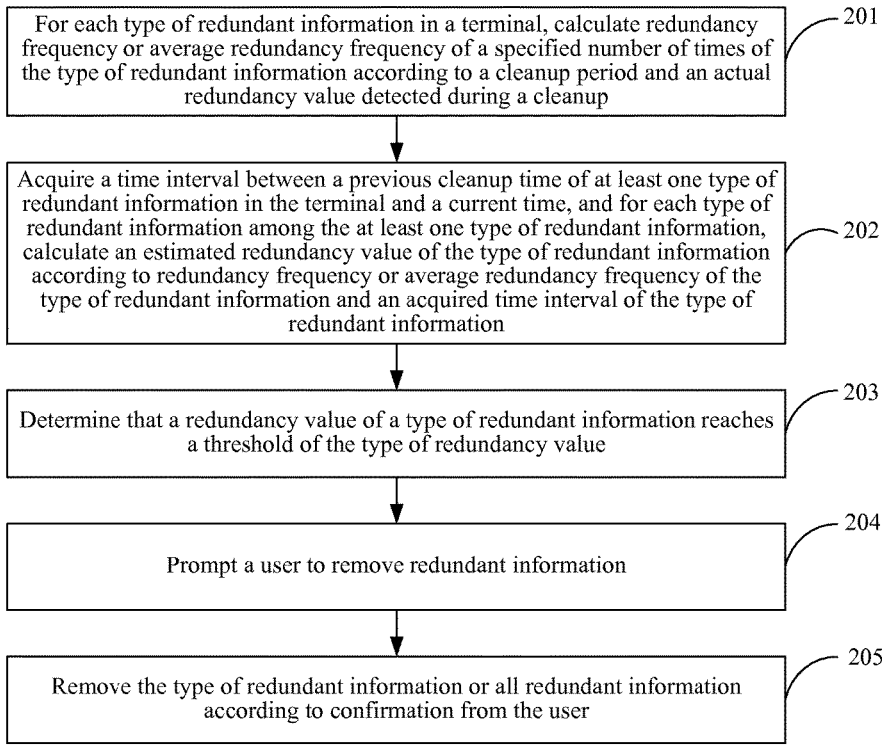
FIG. 2 illustrates a flowchart of a method for removing redundant information of a terminal according to Embodiment 2 of the present invention.

Referring to FIG. 2, this embodiment of the present invention provides a method for removing redundant information of a terminal. Processes of the method include:

Step 201: for each type of redundant information in a terminal, calculating redundancy frequency or average redundancy frequency of a specified number of times of the type of redundant information according to a cleanup period and an actual redundancy value detected during a cleanup.

In this embodiment, redundant information refers to information that is generated when a terminal operates. The terminal may include but be not limited to a computer, a mobile phone, a tablet computer, a PDA, and the like. Because the redundant information is of no use value after a current application program is quitted, the redundant information needs to be removed, so as to improve system performance of the terminal. There are many types of redundant information, and in this embodiment, system garbage and system traces are used as examples for description purposes. Specifically, system garbage is a temporary file or temporary information automatically generated by a terminal during use, such as a temporary file of a system or a browser or an invalid shortcut. A system trace is a historical record of a user operation automatically saved by a system for convenient reuse by the user when a terminal operates, such as a web page that has been browsed, a movie program that has been watched, or a file that has been edited or opened.

Generally, there is a regularity or use pattern in terminal-using behaviors of a user within a certain time period, for example, a user watches an hour of online video, browses news information for half an hour, and spends two hours in chatting with friends online every day. Therefore, there is also a regularity in redundant information of a terminal of the user.

Based on the above regularity, for each type of redundant information in a terminal, redundancy frequency of the type of redundant information can be calculated according to a cleanup period and an actual redundancy value detected during a cleanup, so as to subsequently calculate an estimated redundancy value of the type of redundant information according to the redundancy frequency. For example, when the redundant information is system garbage, if the cleanup period of the terminal is 13 days, and the detected actual redundancy value is 131 Mbit, the calculated redundancy frequency is 10.08 Mbit/day; and when the redundant information is system traces, if the cleanup period of the terminal is 13 days, and the detected actual redundancy value is 50 pieces, the calculated redundancy frequency is 3.85 pieces/day. The cleanup period is calculated according to the number of days. Certainly, the cleanup period may also be set by week, month, or the like, which is not specifically limited in this embodiment.

Further, in order that the redundancy frequency is closer to actual generating frequency of the redundant information, average redundancy frequency may also be calculated according to redundancy frequency of a specified number of times.

For example, when the redundant information is system garbage, sample cleanup periods and actual redundancy values of the redundant information may be as shown in Table 1.

TABLE 1

| Cleanup period (day) | Actual redundancy value (system garbage (Mbit)) |
|---|---|
| 13 | 131 |
| 17 | 161 |
| 11 | 110 |
| 20 | 181 |
| 19 | 171 |
| 15 | 140 |

Therefore, the average redundancy frequency in Table 1 is (131/13+161/17+110/11+181/20+171/19+140/15)/6=9.49 Mbit/day.

For another example, when the redundant information is system traces, sample cleanup periods and actual redundancy values of the redundant information may be as shown in Table 2.

TABLE 2

| Cleanup period (day) | Actual redundancy value (system trace (piece)) |
|---|---|
| 13 | 50 |
| 17 | 69 |
| 11 | 39 |
| 20 | 81 |
| 19 | 69 |
| 15 | 59 |

Therefore, the average redundancy frequency is (50/13+69/17+39/11+81/20+69/19+59/15)/6=3.84 pieces/day.

Further, the method may further include a step of:

for each type of redundant information in the terminal, calculating a threshold of the type of redundant information according to the actual redundancy value detected during a specified number of times of cleanups.

For each type of redundant information in the terminal, an average value may be calculated according to actual redundancy values detected during a specified number of times of cleanups, and is used as a threshold of the type of redundant information, so that the threshold is more consistent with a cleanup habit of the user. For example, based on the above sample data, when the redundant information is system garbage, the threshold is (131+161+110+181+171+140)/6=149 Mbit; and when the redundant information is system traces, the threshold is (50+69+39+81+69+59)/6=61.17 pieces.

Step 202: acquiring a time interval between a previous cleanup time of at least one type of redundant information in the terminal and a current time, and for each type of redundant information among the at least one type of redundant information, calculating an estimated redundancy value of the type of redundant information according to redundancy frequency or average redundancy frequency of the type of redundant information and an acquired time interval of the type of redundant information.

In this embodiment, there may be one or more types of redundant information in the terminal. Therefore, a redundancy value of at least one type of redundant information may be calculated, so as to judge whether the user needs to be prompted to remove redundant information.

This embodiment provides a calculation formula for calculating an estimated redundancy value according to redundancy frequency, that is, estimated redundancy value=redundancy frequency*time interval. For example, when the redundant information is system garbage, supposing that current redundancy frequency is 10 M/day and an acquired time interval of the type of redundant information is 16 days, the estimated redundancy value is 10*16=160 Mbit; and when the redundant information is system traces, supposing that the current redundancy frequency is 4 pieces/day and an acquired time interval of the type of redundant information is 16 days, the estimated redundancy value is 4*16=64 pieces.

This embodiment also provides a calculation formula for calculating an estimated redundancy value according to average redundancy frequency, that is, estimated redundancy value=average redundancy frequency*time interval. For example, using the average redundancy frequency calculated in step 201 as an example and supposing that an acquired time interval of the type of redundant information is 16 days, when the redundant information is system garbage, the estimated redundancy value is 9.49*16=151.84 Mbit; and when the redundant information is system traces, the estimated redundancy value is 3.84*16=61.44 pieces.

Step 203: determining that a redundancy value of a type of redundant information reaches a threshold of the type of redundancy value.

In this embodiment, whether the user needs to be prompted to remove the type of redundant information may be determined according to the estimated redundancy value and the threshold that are calculated in the above steps. Further, it may also be set that when a redundancy value of a type of redundant information is greater than or equal to a threshold of the redundant information, the user is prompted to remove all redundant information, so as to improve system performance.

For example, the redundant information includes system garbage and system traces. Still using the above data as an example for description, the estimated redundancy value of the system garbage is 151.84 Mbit, which is greater than the threshold 149 Mbit, and the estimated redundancy value of the system traces is 61.44 pieces, which is greater than the threshold 61.17 pieces. In such a case, the estimated redundancy values of the system garbage and the system trace are both greater than the respective preset thresholds, so the user is prompted to remove the system garbage and the system traces. Further, according to the above prompt, if the user only removes the system garbage but does not remove the system traces, on the next day, a time interval of the system garbage is 1 day and an estimated redundancy value of the system garbage is 9.49 Mbit, while a time interval of the system traces is 17 days, and an estimated redundancy value of the system traces is 65.24 pieces. In such a case, the estimated redundancy value of the system traces is still greater than the threshold 61.17 pieces of the system trace; therefore, the user is prompted to remove the system traces (or the user may be prompted to remove both the system traces and the system garbage).

Step 204: prompting a user to remove redundant information.

Specifically, the user may be notified of the estimated redundancy value of the terminal in a manner such as a Tip prompt or a popup window, and it is recommended that the user immediately remove the redundant information. For example, content of the prompt is: according to estimations, your system garbage reaches 990 Mbit, and the system traces reach 300 pieces, which have exceeded your previous tolerance limit, and it is recommended to immediately perform a cleanup. The prompt manner and content may be any manner and content that have been known by a person skilled in the art, and are not specifically limited in this embodiment.

Step 205: removing the type of redundant information or all redundant information according to confirmation from the user.

Specifically, a cleanup option may be set for the type of redundant information, so as to make it easier for the user to remove the type of redundant information; or a general cleanup option may be set for all redundant information may be set, so as to make it easier for the user to remove all the redundant information; or a cleanup option may be set for each type of redundant information, so as to make it easier for the user to select to remove one or more types of redundant information. The cleanup manner of redundant information is not limited in this embodiment.

Preferably, the method may further include:

for each type of redundant information during a current cleanup, calculating redundancy frequency of the type of redundant information according to a cleanup period and an actual redundancy value detected during the current cleanup, and updating pre-stored average redundancy frequency of the type of redundant information according to the redundancy frequency.

For example, a current time interval is 16 days. When the redundant information is system garbage, the detected actual redundancy value is 151 Mbit, and current redundancy frequency is 151/16=9.44 Mbit/day, average redundancy frequency that has been updated is (131/13+161/17+110/11+181/20+171/19+140/15+151/16)/7=9.48 Mbit/day, so as to replace the original 9.49 Mbit/day for an update; and when the redundant information is system traces, the detected actual redundancy value is 65 pieces, and current redundancy frequency is 65/16=4.06 pieces/day, average redundancy frequency that has been updated is (50/13+69/17+39/11+81/20+69/19+59/15+65/16)/7=3.87 pieces/day, so as to replace the original 3.84 pieces/day for an update.

Optionally, the method may further include a step of:

for each type of redundancy value during a current cleanup, updating a pre-stored threshold of the type of redundant information according to an actual redundancy value detected during the cleanup.

For example, when the redundant information is system garbage, if a current cleanup value is 151 Mbit, a threshold that has been updated is (131+161+110+181+171+140+151)/7=149.29 Mbit, so as to replace the original 149 Mbit for an update; when the redundant information is system traces, if a current cleanup value is 65 pieces, a threshold that has been updated is (50+69+39+81+69+59+65)/7=61.71 pieces, so as to replace the original 61.17 pieces for an update.

In the foregoing method provided by this embodiment, an estimated redundancy value of at least one type of redundant information in a terminal is calculated; it is determined that an estimated redundancy value of a type of redundant information reaches a threshold of the type of redundancy value; a user is prompted to remove redundant information; and the type of redundant information or all redundant information is removed according to confirmation from the user. In this way, an estimated redundancy value of redundant information of a terminal can be calculated actively by analyzing historical redundant data information of a user, and the user is prompted to process redundant information that reaches a threshold without the need for scanning, thereby saving system resources, improving system performance, and also saving user time.

Additionally, for each type of redundant information in the terminal, a threshold of the type of redundant information is calculated according to an actual redundancy value detected during a specified number of times of cleanups, so that the threshold of the redundant information is more consistent with a cleanup habit of the user, thereby improving user experience.

Embodiment 3

Figure 3:
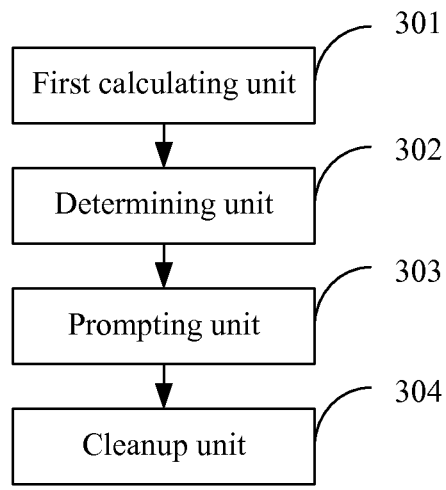
FIG. 3 illustrates a schematic structural diagram of an apparatus for removing redundant information of a terminal according to Embodiment 3 of the present invention.

Referring to FIG. 3, an embodiment of the present invention provides an apparatus for removing redundant information of a terminal, the apparatus including:

a first calculating unit 301, configured to calculate an estimated redundancy value of at least one type of redundant information in a terminal; a determining unit 302, configured to determine that an estimated redundancy value of a type of redundant information reaches a threshold of the type of redundancy value; a prompting unit 303, configured to prompt a user to remove redundant information; and a cleanup unit 304, configured to remove the type of redundant information or all redundant information according to confirmation from the user.

Figure 4:
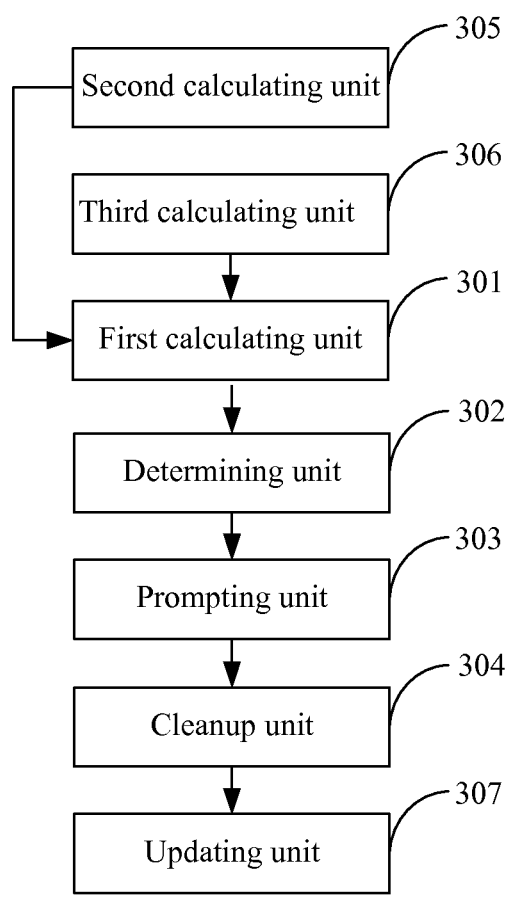
FIG. 4 illustrates another schematic structural diagram of an apparatus for removing redundant information of a terminal according to Embodiment 4 of the present invention.

Referring to FIG. 4, in this embodiment, the apparatus may further include:

a second calculating unit 305, configured to, for each type of redundant information in the terminal, calculate, before the first calculating unit 301 calculates the estimated redundancy value of the at least one type of redundant information in the terminal, redundancy frequency or average redundancy frequency of a specified number of times of the type of redundant information according to a cleanup period and an actual redundancy value detected during a cleanup. In this embodiment, the first calculating unit 301 is further configured to acquire a time interval between a previous cleanup time of at least one type of redundant information in the terminal and a current time, and for each type of redundant information among the at least one type of redundant information, calculate an estimated redundancy value of the type of redundant information according to redundancy frequency or average redundancy frequency of the type of redundant information and an acquired time interval of the type of redundant information.

Referring to FIG. 4, in this embodiment, the apparatus may further include:

a third calculating unit 306, configured to, for each type of redundant information in the terminal, calculate a threshold of the type of redundant information according to the actual redundancy value detected during a specified number of times of cleanups.

Referring to FIG. 4, in this embodiment, the apparatus may further include:

an updating unit 307, configured to, for each type of redundant information during a current cleanup, calculate redundancy frequency of the type of redundant information according to a cleanup period and an actual redundancy value detected during the current cleanup, and update pre-stored average redundancy frequency of the type of redundant information according to the redundancy frequency.

In this embodiment, the apparatus for removing redundant information of a terminal may be located in a terminal. The terminal may include but be not limited to a computer, a mobile phone, a tablet computer, a PDA, and the like.

The foregoing apparatus provided by this embodiment calculates an estimated redundancy value of at least one type of redundant information in a terminal; determines that an estimated redundancy value of a type of redundant information reaches a threshold of the type of redundancy value; prompts a user to remove redundant information; and removes the type of redundant information or all redundant information according to confirmation from the user. The apparatus can calculate an estimated redundancy value of redundant information of a terminal actively by analyzing historical redundant data information of a user, and prompt the user to process redundant information that reaches a threshold without the need for scanning, thereby saving system resources, improving system performance, and also saving user time.

Additionally, for each type of redundant information in the terminal, a threshold of the type of redundant information is calculated according to an actual redundancy value detected during a specified number of times of cleanups, so that the threshold of the redundant information is more consistent with a cleanup habit of the user, thereby improving user experience.

It should be noted that, the above functional units (modules) are only described for exemplary purposes when the apparatus for removing redundant information of a terminal provided by the foregoing embodiment removes redundant information. In actual applications, the functions may be allocated to different functional units according to specific needs, which means that the internal structure of the apparatus for removing redundant information of a terminal is divided to different functional units to complete all or some of the above described functions. In addition, the apparatus for removing redundant information of a terminal provided by the foregoing embodiment are based on the same concept as the embodiments of the method for removing redundant information of a terminal. For the specific implementation process, refer to the method embodiments, and the details are not described herein again.

In various embodiments, the apparatus may be configured within the computing terminal or within a different computing device connected to the computing terminal. For example, the computing terminal may include one or more processors. A non-transitory storage medium may be configured within or outside the computing terminal.

For example, the non-transitory computer readable storage medium may include a computer readable program stored thereon. When being executed, the computer readable program causes the one or more processors of the computing terminal to implement the disclosed method for removing redundant information in the computing terminal.

Figure 5:
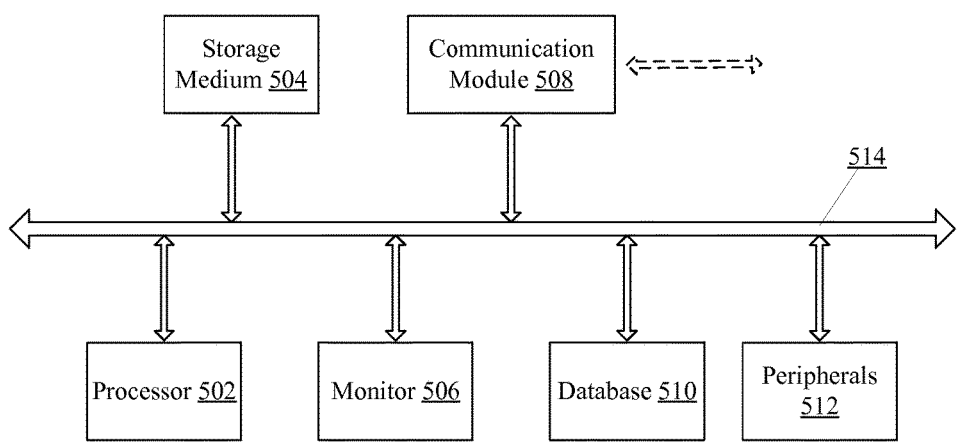
FIG. 5 illustrates an exemplary computing terminal consistent with the disclosed embodiments.

FIG. 5 illustrates an exemplary computing terminal (e.g., a mobile terminal) capable of implementing the disclosed methods, consistent with the disclosed embodiments. As shown in FIG. 5, the exemplary computing terminal 500 may include a processor 502, a storage medium 504, a monitor 506, a communication module 508, a database 510, peripherals 512, and one or more bus 514 to couple the devices together. Certain devices may be omitted and other devices may be included.

Processor 502 may include any appropriate processor or processors. Further, processor 502 may include multiple cores for multi-thread or parallel processing. The processor 502 may be used to run computer program(s) stored in the storage medium 504. Storage medium 504 may include memory modules, such as ROM, RAM, and flash memory modules, and mass storages, such as CD-ROM, U-disk, removable hard disk, etc. Storage medium 504 may store computer programs for implementing various disclosed processes, when executed by processor 502. In one embodiment, storage medium 504 may be a non-transient computer-readable storage medium having a computer program stored thereon, when being executed, to cause the computer to implement the disclosed methods.

Further, peripherals 512 may include I/O devices such as keyboard and mouse, and communication module 508 may include network devices for establishing connections, e.g., through a communication network such as the Internet. Database 510 may include one or more databases for storing certain data and for performing certain operations on the stored data, such as webpage browsing, database searching, etc.

In one embodiment, the computing device illustrated in FIG. 5 may include the disclosed system for processing a sliding event. For example, the system may include one or more processors and a non-transitory computer-readable storage medium having instructions/programs stored thereon, the instructions/programs executed by the one or more processors and including the modules and units disclosed in the system for processing a sliding event.

The sequence numbers of the foregoing embodiments of the present invention are merely for the convenience of description, but do not imply the preference among the embodiments.

A person of ordinary skill in the art may understand that, all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The embodiments of the present invention are described above, but they are not intended to limit the scope of the present disclosure. Any modification, equivalent replacement or improvement made within the spirit and principle of the present disclosure shall fall within the protection scope of the claims of this application.

What is claimed is:

1. A method for removing redundant information in a computing terminal, comprising:
   performing, by the computer terminal, a plurality of cleanup processes;
   detecting, by the computer terminal, a type of redundant information in the plurality of cleanup processes, wherein the type of redundant information comprises system garbage and system traces in the computing terminal;
   determining, by the computer terminal, a plurality of actual redundancy values of the type of redundant information in the plurality of cleanup processes;
   calculating, by the computer terminal, a threshold value by averaging the plurality of actual redundancy values detected in the plurality of cleanup processes;
   calculating, by the computer terminal, a redundancy frequency or an average redundancy frequency of the type of redundant information according to a cleanup period and an actual redundancy value detected during a cleanup process;

calculating, by the computer terminal, an estimated redundancy value of the type of redundant information in the computing terminal based on the redundancy frequency or the average redundancy frequency of the type of redundant information;

determining, by the computer terminal, whether the estimated redundancy value of the type of redundant information reaches the threshold value;

when the estimated redundancy value of the type of redundant information reaches the threshold value, prompting a user to remove the type of redundant information; and removing, by the computer terminal, the type of redundant information according to a confirmation from the user, such that the estimated redundancy value of the type of redundant information in the computer terminal is obtained actively by analyzing a historical record of operation; and by actively obtaining the estimated redundancy value without the user's instruction.

2. The method according to claim 1, wherein the step of calculating the estimated redundancy value of the type of redundant information in the computing terminal further comprises:

acquiring a time interval between a previous cleanup time point of the type of redundant information in the computing terminal and a current time point.

3. The method according to claim 1, further comprising: calculating the threshold value of the type of redundant information according to the actual redundancy value detected during a specified number of times of clean processes.

4. The method according to claim 1, further comprising:
calculating the redundancy frequency of the type of redundant information according to a cleanup period and an actual redundancy value detected during a current cleanup process, and
updating a pre-stored average redundancy frequency of the type of redundant information according to the redundancy frequency.

5. The method according to claim 1, wherein the system garbage comprises a temporary file or a temporary information automatically generated by the computing terminal during use; and the system trace comprises the historical record of operation automatically saved by the computing terminal.

6. An apparatus for removing redundant information in a computing terminal, comprising:
a memory; and
a processor coupled to the memory, the processor being configured to:
perform, by the computer terminal, a plurality of cleanup processes;
detect, by the computer terminal, a type of redundant information in the plurality of cleanup processes, wherein the type of redundant information comprises system garbage and system traces in the computing terminal;
determine, by the computer terminal, a plurality of actual redundancy values of the type of redundant information in the plurality of cleanup processes;
calculate, by the computer terminal, a threshold value by averaging the plurality of actual redundancy values detected in the plurality of cleanup processes;

calculate, by the computer terminal, a redundancy frequency or an average redundancy frequency of the type of redundant information according to a cleanup period and an actual redundancy value detected during a cleanup process;

calculate, by the computer terminal, an estimated redundancy value of the type of redundant information in the computing terminal based on the redundancy frequency or the average redundancy frequency of the type of redundant information;

determine, by the computer terminal, whether the estimated redundancy value of the type of redundant information reaches a threshold value;

prompt, by the computer terminal, a user to remove the type of redundant information; and remove, by the computer terminal, the type of redundant information according to a confirmation from the user, such that the estimated redundancy value of the type of redundant information in the computer terminal is obtained actively by analyzing a historical record of operation; and by actively obtaining the estimated redundancy value without the user's instruction.

7. The apparatus according to claim 6, wherein the processor is further configured to acquire a time interval between a previous cleanup time point of the type of redundant information in the computing terminal and a current time point.

8. The apparatus according to claim 6, the processor being further configured to: calculate the threshold value of the type of redundant information according to the actual redundancy value detected during a specified number of times of clean processes.

9. The apparatus according to claim 6, the processor being further configured to:
calculate the redundancy frequency of the type of redundant information according to a cleanup period and an actual redundancy value detected during a current cleanup process, and to update a pre-stored average redundancy frequency of the type of redundant information according to the redundancy frequency.

10. A non-transitory computer readable storage medium comprising a computer readable program stored thereon, wherein, when being executed, the computer readable program causes one or more processors to implement a method for removing redundant information in a computing terminal, the method comprising:
performing, by the computer terminal, a plurality of cleanup processes;
detecting, by the computer terminal, a type of redundant information in the plurality of cleanup processes, wherein the type of redundant information comprises system garbage and system traces in the computing terminal;
determining, by the computer terminal, a plurality of actual redundancy values of the type of redundant information in the plurality of cleanup processes;
calculating, by the computer terminal, a threshold value by averaging the plurality of actual redundancy values detected in the plurality of cleanup processes;
calculating, by the computer terminal, a redundancy frequency or an average redundancy frequency of the type of redundant information according to a cleanup period and an actual redundancy value detected during a cleanup process;
calculating, by the computer terminal, an estimated redundancy value of the type of redundant information in the computing terminal based on the redundancy frequency or the average redundancy frequency of the type of redundant information;

determining, by the computer terminal, whether the estimated redundancy value of the type of redundant information reaches a threshold value;

prompting, by the computer terminal, a user to remove the type of redundant information; and removing, by the computer terminal, the type of redundant information according to a confirmation from the user, such that the estimated redundancy value of the type of redundant information in the computer terminal is obtained actively by analyzing a historical record of operation; and by actively obtaining the estimated redundancy value without the user's instruction.

11. The non-transitory computer readable storage medium according to claim 10, wherein the step of calculating the estimated redundancy value of the type of redundant information in the computing terminal further comprises:

acquiring a time interval between a previous cleanup time point of the type of redundant information in the computing terminal and a current time point.

12. The non-transitory computer readable storage medium according to claim 10, further comprising:

calculating the threshold value of the type of redundant information according to the actual redundancy value detected during a specified number of times of clean processes.

13. The non-transitory computer readable storage medium according to claim 10, further comprising: calculating the redundancy frequency of the type of redundant information according to a cleanup period and an actual redundancy value detected during a current cleanup process, and updating a pre-stored average redundancy frequency of the type of redundant information according to the redundancy frequency.

* * * * *